United States Patent
Schoene (10) Patent No.: US 7,281,685 B2
(45) Date of Patent: Oct. 16, 2007

(54) FLUSH-TOP SEAT MOUNTING RAIL FOR PASSENGER AIRCRAFT

(75) Inventor: Wolfram Schoene, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 46 days.

(21) Appl. No.: 11/209,497

(22) Filed: Aug. 22, 2005

(65) Prior Publication Data
US 2006/0038071 A1 Feb. 23, 2006

Related U.S. Application Data

(60) Provisional application No. 60/631,333, filed on Nov. 29, 2004.

(30) Foreign Application Priority Data
Aug. 20, 2004 (DE) ............... 10 2004 040 328

(51) Int. Cl.
*B64D 11/06* (2006.01)
(52) U.S. Cl. ............... 244/118.6; 296/65.13
(58) Field of Classification Search ............ 244/118.1, 244/118.6, 117 R, 119; 384/34; 248/503.1, 248/429; 297/463.1; 410/104, 105; 296/65.13, 296/65.03
See application file for complete search history.

(56) References Cited

U.S. PATENT DOCUMENTS

| | | | |
|---|---|---|---|
| 4,475,701 A | | 10/1984 | Martin |
| 4,479,621 A | * | 10/1984 | Bergholz ............. 244/117 R |
| 5,890,768 A | * | 4/1999 | Beurteaux et al. ....... 297/463.1 |
| 6,498,297 B2 | | 12/2002 | Samhammer |
| 6,554,225 B1 | * | 4/2003 | Anast et al. ............ 244/117 R |
| 7,051,978 B2 | * | 5/2006 | Reed et al. ............... 244/118.1 |
| 7,093,797 B2 | * | 8/2006 | Grether et al. ........... 244/118.1 |
| 7,100,885 B2 | * | 9/2006 | Zerner .................... 248/503.1 |
| 7,163,178 B2 | * | 1/2007 | Ricaud ................... 244/118.1 |
| 7,195,201 B2 | * | 3/2007 | Grether et al. ........... 244/118.1 |
| 7,207,756 B2 | * | 4/2007 | Vichniakov et al. ........ 410/115 |
| 2005/0133666 A1 | | 6/2005 | Zerner |
| 2005/0156095 A1 | | 7/2005 | Vichniakov et al. |
| 2005/0211833 A1 | * | 9/2005 | Frantz et al. ............ 244/118.1 |
| 2005/0211840 A1 | * | 9/2005 | Grether et al. ............ 244/119 |

FOREIGN PATENT DOCUMENTS

| | | |
|---|---|---|
| DE | 42 24 821 | 2/1994 |
| EP | 0 922 632 | 6/1999 |
| GB | 2 320 183 | 6/1998 |
| RU | 2 136 548 | 9/1999 |

* cited by examiner

Primary Examiner—Michelle Clement
Assistant Examiner—Benjamin P. Lee
(74) Attorney, Agent, or Firm—W. F. Fasse; W. G. Fasse (57) ABSTRACT

Preferably a seat mounting rail for a passenger aircraft includes a base connected to a crown by a web. The crown includes two support flanges protruding laterally in opposite directions from a reinforcement zone that connects to the web and that has a seat-securing groove extending longitudinally therealong. Floor panel elements can be supported on the support flanges. The reinforcement zone top surface preferably does not protrude above the support flange top surfaces but rather is at least substantially flush and planar therewith. The single horizontal base flange forming the base, the single vertical web and the support flanges preferably form a generally I-shaped sectional profile. The reinforcement zone may include a triangular sectional hollow lower reinforcement structure tapering to the top of the web. Large-area floor panels can span continuously laterally over the rail and can be arranged independently of the spacing between the rails.

19 Claims, 3 Drawing Sheets

Fig. 3

FLUSH-TOP SEAT MOUNTING RAIL FOR PASSENGER AIRCRAFT

PRIORITY CLAIM

This application is based on and claims the priorities under 35 U.S.C. §119 of German Patent Application 10 2004 040 328.7, filed on Aug. 20, 2004, and of U.S. Provisional Application 60/631,333, filed on Nov. 29, 2004, the entire disclosures of both of which are incorporated herein by reference.

FIELD OF THE INVENTION

The invention relates to a seat rail profile for a passenger transport conveyance or vehicle, especially for a passenger aircraft, comprising a profile crown and a profile base which are interconnected by a web. The profile crown includes a reinforcement zone having a longitudinally extending groove therein for securing seats or other cabin outfitting components, and support surfaces or flanges extending laterally from the reinforcement zone for supporting floor panels or other panel elements.

BACKGROUND INFORMATION

From the state of the art, various embodiments of seat rail profiles are known. For example, seat rail profiles are used in conjunction with transverse girders to form the load-bearing structure of the floor frame within the fuselage structure of passenger aircraft. Apart from the static functions relating to the structure of the entire aircraft, and the bearing function relating to the floor panels, seat rails also provide a connection base for the attachment of further outfitting components or equipment elements, in particular passenger seats, toilet modules, galley modules, partition walls, trim elements, storage containers and the like. Generally, known seat rail profiles are extrusion molded from aluminum alloys. Seat rail profiles may also be used similarly in the construction of other passenger transport vehicles such as trains and ships.

Known seat rails usually comprise a reinforced profile crown, on the lower end or side of which support flanges or support surfaces are integrated as bearing surfaces for the floor panels. In other words, the support flanges protrude laterally from the bottom end or edges of the sides of the reinforcement zone, and the reinforcement zone protrudes upwardly above the upper surface of the support flanges. Also, the reinforced profile crown has therein an undercut groove so that attachment elements of the above-mentioned outfitting components can be inserted and locked into the groove at selected positions. Furthermore, the groove preferably comprises a locking arrangement, which makes it possible to position the outfitting components at defined grid dimensions in longitudinal direction of the groove, for example in grid dimensions of 2.54 centimeters or 1 inch, which is a dimension common in aircraft construction.

Between the top of the profile crown and the tops of the flanges there is a step or recess whose height preferably corresponds approximately to the thickness of the floor panels so as to ensure an essentially flat uninterrupted surface of the floor flushly aligned with the top of the reinforcement zone, that is formed in this way within the fuselage structure of the aircraft. In order to ensure the necessary bending resistance or stiffness, the base of the crown then leads to a central web, which in turn comprises flanges on its lower end, which flanges, depending on the design, can be used both for attaching the seat rail profile to the transverse girders and for ensuring the required rigidity.

Due to the design of the known seat rail profiles with a shoulder or recess in the region of the profile crown to receive the floor panels so that they are flush with each other, the floor panels cannot be positioned freely between the seat rails. The width that is possible for the floor panels is always specified and strictly limited by the distance between adjacent ones of the seat rails. Moreover, the further outfitting components intended for installation on the seat rails, in particular passenger seats, toilet modules, galley modules, partition walls, trim elements, storage containers or the like, need to have an attachment dimension at least across the longitudinal direction of the seat rail profile, which attachment dimension always corresponds to the spacing distance or to an integral multiple of the spacing distance between the seat rails. Implementing various equipment or outfitting variants in the passenger cabin is made difficult by this fixed grid dimensioning. Finally, the known embodiments are associated with an increased sealing effort, in particular in galley and sanitary areas such as toilet compartments or restrooms, because the region where the floor panels abut the seat rail profiles requires cumbersome and expensive sealing work.

SUMMARY OF THE INVENTION

In view of the above, it is an object of the invention to provide a seat rail profile that, among other things, allows free positioning of the floor panels also extending over the seat rails, and more freedom and flexibility of positioning and mounting outfitting components on the floor of the passenger cabin. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a mounting arrangement including a mounting rail for mounting cabin outfitting components in a passenger cabin of a passenger transport vehicle. The mounting rail comprises a profile base connected to a profile crown by a web. The profile crown comprises two support flanges protruding laterally opposite one another from a reinforcement zone that connects and transitions from the support flanges to the web. The reinforcement zone has therein a groove that extends longitudinally therealong in a longitudinal direction of the mounting rail and that is adapted to receive a securing element to secure a cabin outfitting component. The support flanges have flange top surfaces adapted to support panel elements thereon. A reinforcement zone top surface of the reinforcement zone is at least substantially flush and planar with the flange top surfaces, or at least does not protrude upwardly above the flange top surfaces, so that the flange top surfaces together form a single bearing surface for receiving and supporting the panel elements thereon.

In a preferred embodiment of the invention, the profile base is a single horizontal base flange that is connected to a bottom of the web and that protrudes laterally in two opposite directions from the web, and the only interconnection between the profile crown and the profile base is the web which is a single vertical web. Thus, the mounting rail preferably has an overall generally I-shaped sectional profile configuration formed of the support flanges, the web and the horizontal base flange.

According to a further preferred feature of the invention, the reinforcement zone includes an upper reinforcement structure having the groove defined therein, and a lower reinforcement structure that taperingly transitions from the upper reinforcement structure to the web. The lower reinforcement structure includes two reinforcement webs extending from a bottom of the upper reinforcement structure to a top of the web and forming a triangular sectional configuration enclosing a hollow triangular sectional chamber between the two reinforcement webs and the bottom of the upper reinforcement structure.

Thus, according to a special feature of the invention, the support surfaces, i.e. the upper surfaces of the support flanges, preferably form an essentially flat or planar bearing surface flush with (or optionally above) the top of the reinforcement zone. In other words, the reinforcement zone top surface is at least substantially (or completely) flush and planar with (or optionally below) the support flange top surfaces. The terms "substantially" and "essentially" allow for a slight surface discontinuity or lack of planar flush alignment, while still allowing a floor panel to span over a seat rail and be supported on the two support flange surfaces thereof without being hindered by an intervening protruding reinforcement zone. Also, the reinforcement zone surface may be recessed below the support flange surfaces as mentioned. In any event, with this configuration and arrangement, the invention allows the use of even large-area floor panels spanning continuously (uninterrupted) across a plurality of seat rails.

By means of the seat rail profile according to the invention, positioning of panel-shaped elements, in particular of floor panels, can be adjusted quickly and flexibly to meet a multitude of various equipment or outfitting requirements independently of the grid dimension specified by the arrangement of the seat rails. Furthermore, the effort required for sealing between the floor panels and the seat rails or between the floor panels themselves is clearly reduced because large-area floor panels can be used which extend beyond individual seat rail profiles. If necessary, the outfitting components can also be freely positioned and secured on the large-area floor panels and fixed independently of the grid dimension of the seat rails. In this case, for example, direct attachment of the outfitting components by suitable attachment means (e.g. bolts, screws, brackets, adhesives, etc.) to the floor panels is possible.

By means of suitable attachment elements (e.g. bolts, screws, brackets, groove insert members, etc.), the floor panels are in turn attached to the seat rail profile according to the invention, in the region of the support surfaces of the support flanges. In a way that differs from this, the outfitting components are preferably attached in the region of the groove, or if the groove is covered by floor panels, directly to the floor panels themselves. To provide the floor frame, by means of suitable attachment means, the seat rail profile is connected in the known way, in the region of the profile base, to the transverse girders or other construction elements within the fuselage airframe of the aircraft.

According to an advantageous embodiment of the seat rail profile according to the invention, the groove comprises a cross-sectional geometry which widens toward the bottom, in particular an upside-down T-shaped or dovetail cross-sectional geometry. This geometric design of the groove makes it possible to provide a safe, locally flexible, and at the same time temporary or releasable attachment of outfitting components by means of the seat rail profile.

A further advantageous embodiment provides for cover elements to be able to be arranged in the region of the groove. This prevents soiling of the groove with dirt particles and/or the entry of liquids with a corrosive effect. Furthermore, the visual/aesthetic impression of the overall arrangement is enhanced, and the cover element is prevented from falling out especially if it has one or more protruding elements that mate or engage into the groove.

According to a further embodiment of the seat rail profile, the cover elements are extruded strand or billet-shaped. This design makes possible in particular simple production and insertion of the cover elements in the groove. Furthermore, the billet-shaped design makes it possible to produce the cover elements from thermoplastics in the continuous extrusion process.

According to a further advantageous embodiment of the seat rail profile, the cover elements and the panel-shaped elements form an essentially flat surface. This embodiment results in an essentially uninterrupted flat surface, on which it is safe to walk, for example of a floor formed with the seat rails and corresponding floor panels within the fuselage cell of a passenger aircraft.

A further embodiment provides for the web of the seat rail to comprise, at least in some sections, an additional reinforcement region which provides a transition to the reinforcement zone. This may be considered as an arrangement in which the overall reinforcement zone includes an upper reinforcement structure having the groove therein and a lower reinforcement structure that taperingly transitions from the upper reinforcement structure to the web. By means of this, a stronger structure is achieved, and it is possible to attach outfitting components of greater mass to the seat rails. Such outfitting components can for example be sanitary modules, galley modules, partition walls, trim elements, storage containers or the like.

According to a further advantageous embodiment, the seat rail profile is formed by a continuous extrusion-pressed or extruded profile, in particular a continuous aluminum or titanium extruded profile. This enables continuous seamless production of the seat rail profile according to the invention by means of known production processes in long lengths. Moreover, the use of continuous aluminum extruded profiles, in particular in conjunction with corresponding aluminum alloys, results in a considerable saving of weight. Corresponding strength characteristics can be achieved with the use of titanium alloys. Carbon fiber reinforced plastic materials, such as for example CFRP (carbon fiber reinforced plastics), can be used as the material for the seat rail profile in order to obtain a lightweight design.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
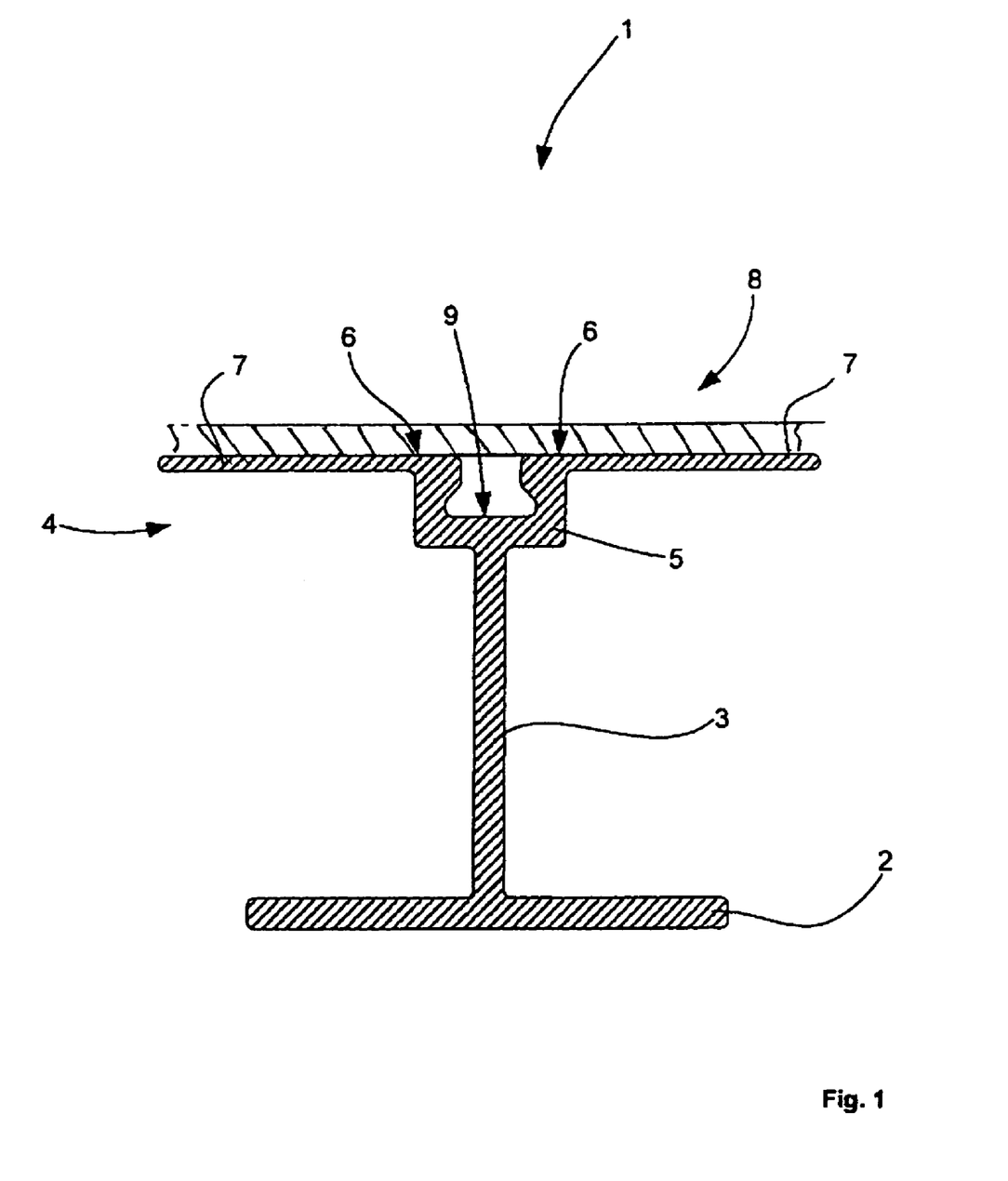
FIG. 1 is a cross-sectional view of a first embodiment of a seat rail profile according to the invention.

FIG. 1 shows a first embodiment of a seat mounting rail or seat rail profile 1 according to the invention. The seat rail profile 1 essentially comprises a profile base 2 which is connected to a profile crown 4 by a web 3. There is thus only a single vertical web 3 interconnecting the profile crown 4 with the profile base 2, and the profile base 2 is preferably a single continuous horizontal flange T-jointed to the bottom end of the single web 3 so as to protrude laterally in both opposite directions from the bottom end of the single web 3. The profile crown 4 comprises a reinforcement zone 5 and two support surfaces or support flanges 7 protruding opposite one another on both sides of the top 6 of the reinforcement zone 5, to form an essentially uninterrupted support or bearing surface 8 for supporting floor panels (not shown in detail in FIG. 1, but see floor panels 10 in FIG. 2) to form a flat, uninterrupted floor. The seat rail profile 1 thus has an overall generally I-shaped sectional profile configuration formed of the support flanges 7, the web 3 and the horizontal base flange 2.

A groove 9 is arranged in the reinforcement zone 5. In this arrangement, the groove 9 comprises a cross-sectional geometry which widens toward the bottom, in particular an undercut or dovetail shape. The groove 9 is in particular used for the attachment of outfitting components (not shown in detail in the drawing). These outfitting components can, for example, be passenger seats, toilet modules, galley modules, partition walls, trim elements, storage containers and the like. By means of suitable attachment elements, the outfitting components are safely attached within the groove 9, in a removable or releasable manner so that they can be detached if required. Furthermore, the groove 9 comprises a locking or catch arrangement (which is not shown in detail, but which may be according to any conventionally known or future developed designs) which makes possible locking in the longitudinal direction, i.e. perpendicular to the drawing plane in FIG. 1, preferably only at a defined grid spacing. Preferably, the grid spacing is in a dimension that is customary in aircraft construction, for example approximately 2.54 cm or 1 inch. Accordingly, the outfitting components can be attached to the seat rail profile 1 at grid increments of approximately 2.54 cm or 1 inch in the longitudinal direction, which allows flexible positioning and adaptation to various equipment requirements.

In a particularly preferred embodiment, the seat rail profile 1 is produced with at least one aluminum alloy and is preferably produced in a continuous extrusion process so that the seat rail profile 1 is available in almost any lengths required. Titanium alloys are another possible material. Furthermore, as another alternative, carbon fiber reinforced plastic materials, such as for example CFRP (carbon fiber reinforced plastics) can be used for the seat rail profile.

By means of the profile base 2, the seat rail profile 1 is connected to transverse girders (not shown in detail in FIG. 1) in the fuselage structure of an aircraft so as to form a floor frame. The floor frame, which is formed of seat rail profiles 1 and transverse girders, has to meet increased static minimum requirements because the floor frame has to absorb forces emanating from the fuselage structure. In other words the fuselage structure derives additional stability from the floor frame. Therefore, the material strengths and cross-sectional geometries of the profile crown 4, the web 3 and the profile base 2 have to be such that the seat rail profile 1 provides adequate bending resistance. Furthermore, the aluminum alloys used for producing the seat rail profile 1 should provide high static strength, good corrosion resistance and good fracture toughness.

Figure 2:
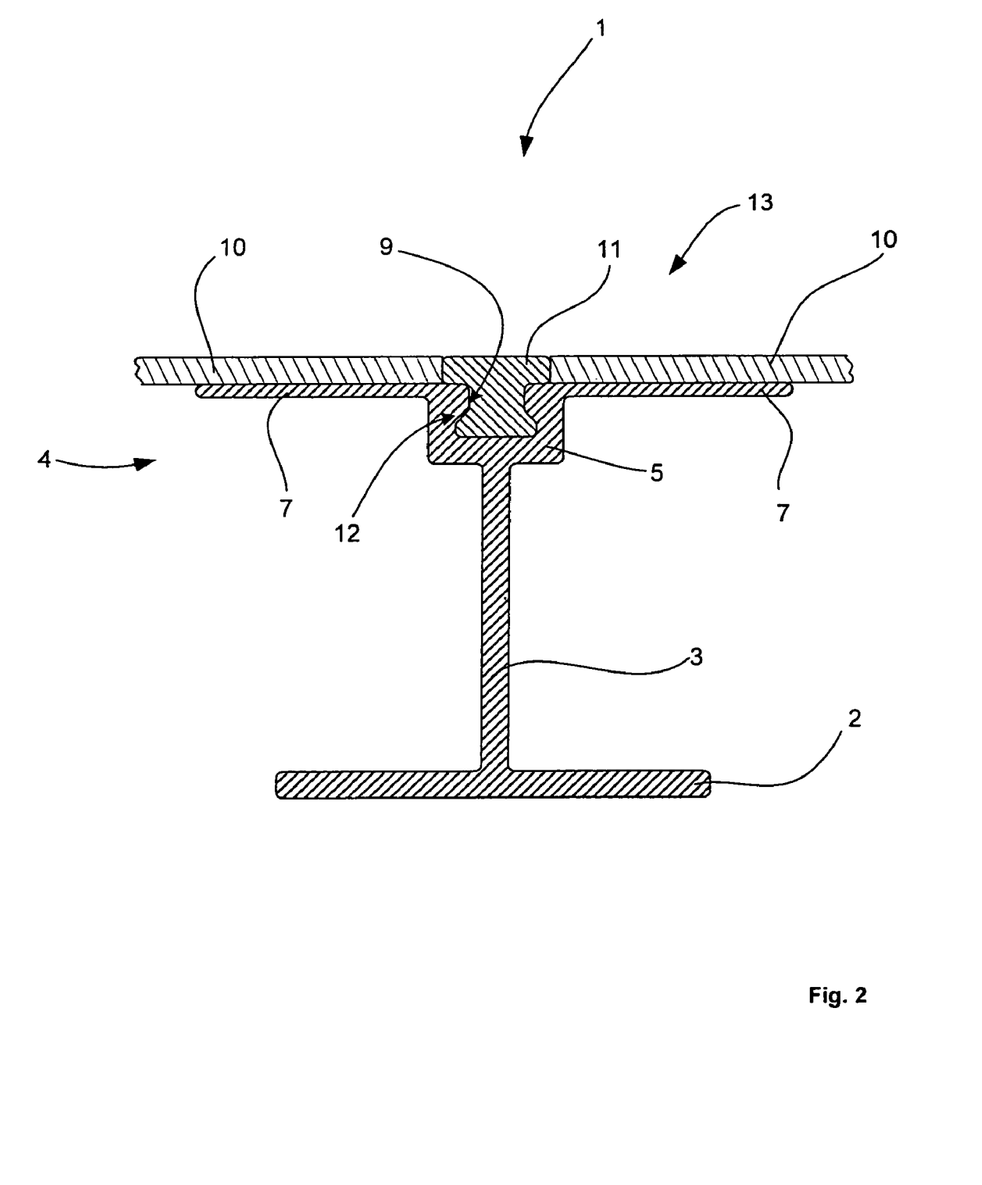
FIG. 2 is a cross-sectional view of the first embodiment of the seat rail profile with a cover element and panel-shaped elements arranged thereon.

FIG. 2 shows a cross-section of the seat rail profile 1 with floor panels 10 supported in place thereon. In this arrangement the floor panels 10 are essentially supported by the support surfaces of the support flanges 7, which are connected and protrude laterally respectively on both sides of the reinforcement zone 5. The profile crown 4 comprises the reinforcement zone 5 with the groove 9, as well as the support flanges 7. The reinforcement zone 5 is connected to the profile base 2 by means of the web 3. In this arrangement the floor panels 10 are firmly connected or secured to the support flanges 7 by attachment means such as screws, bolts, rivets, clips, brackets, adhesives etc. (not shown in detail).

The arrangement further comprises a cover element 11 that can be arranged in the groove 9 as required (e.g. at locations where there is no seat or other outfitting component secured in the groove and where the groove is not covered by a floor panel). The cover element 11 is designed to have a positive mating fit in the groove 9, at least in a lower region 12, so as to ensure firm seating and in this way to prevent the cover element 11 from falling out. On the one hand the cover element 11 is used to form (together with the floor panels 10) a floor surface 13 which is essentially uninterrupted, flat and able to be walked upon, while at the same time improving the overall visual appearance. On the other hand the cover element 11 prevents the ingress of dirt particles, liquids and other extraneous matter into the groove 9, which matter could otherwise result in corrosion of the seat rail profile 1 and in other undesirable effects. In particular in the area of passenger access, as well as in galley and sanitary areas of aircraft, corrosion protection assumes special importance.

In addition to the cover element 11 shown, further measures can be taken to provide sealing between the floor panels 10 and the seat rail profile 1. To this effect, for example a sealing compound (sealant) can be applied between the floor panels 10 and the support surfaces of the support flanges 7. Furthermore, it is possible to insert the cover element 11 together with a sealing compound in the groove 9 to provide an improved sealing effect.

Preferably the cover element 11 is an extruded sectional strand-shaped member or billet-shaped member and is made using known extrusion methods, for example made of thermoplastic plastic materials. In this way the cover element 11 can be stored in space-saving roll-form and can subsequently be processed (e.g. unrolled, cut to the required length, and pressed or slipped into the pertinent sections of the rail groove 9). In this way it is easy, if required, to cut sections of various lengths from the cover element 11 for subsequent processing.

Deviating from the embodiment shown in FIG. 2, it is alternatively possible to design the cover element 11 so that it does not positively or matingly fit the cross-sectional geometry of the groove 9. In this case the cover element 11 can, for example, comprise a rectangular cross-sectional geometry of adequate width so as to cover up on both sides any space which results between the floor panels 10. Preferably, in this case the height of the cover element 11 is reduced so that the surface 13 of the resulting floor is as flat as possible, and to the extent possible without steps or shoulders. In this embodiment the rectangular cover element 11 can, for example, be fixed in the margin area of the floor panels 10 by means of an adhesive connection.

Further differing from the embodiment shown in FIG. 2, it is moreover possible to cover the seat rail profile 1 according to the invention with large-area uninterrupted floor panels 10, which span continuously over and cover one or several seat rail profiles at the same time. The width of the floor panels 10 can therefore be selected almost independently of the distance between seat rail profiles 1. This embodiment is advantageous in that there is no need for the previously described expensive sealing measures in the groove cover regions, which sealing measures would otherwise be necessary in the regions between the floor panels 10 and the support flanges 7 or between the floor panels 10 and the cover element 11. In this case the floor panels 10 are then connected to the support flanges 7 of the seat rail with suitable attachment means, for example screws, rivets or adhesive connections.

Furthermore, the outfitting components in the aircraft cabin (already mentioned above) can have attachment dimensions which can be selected largely independently of the spacing distance between seat rails, provided the outfitting components concerned are attached directly to the uninterrupted floor panels 10 rather than, or in addition to, being secured to the seat rails. This allows relatively free and flexible adaptation of the position of outfitting components to changing needs.

Figure 3:
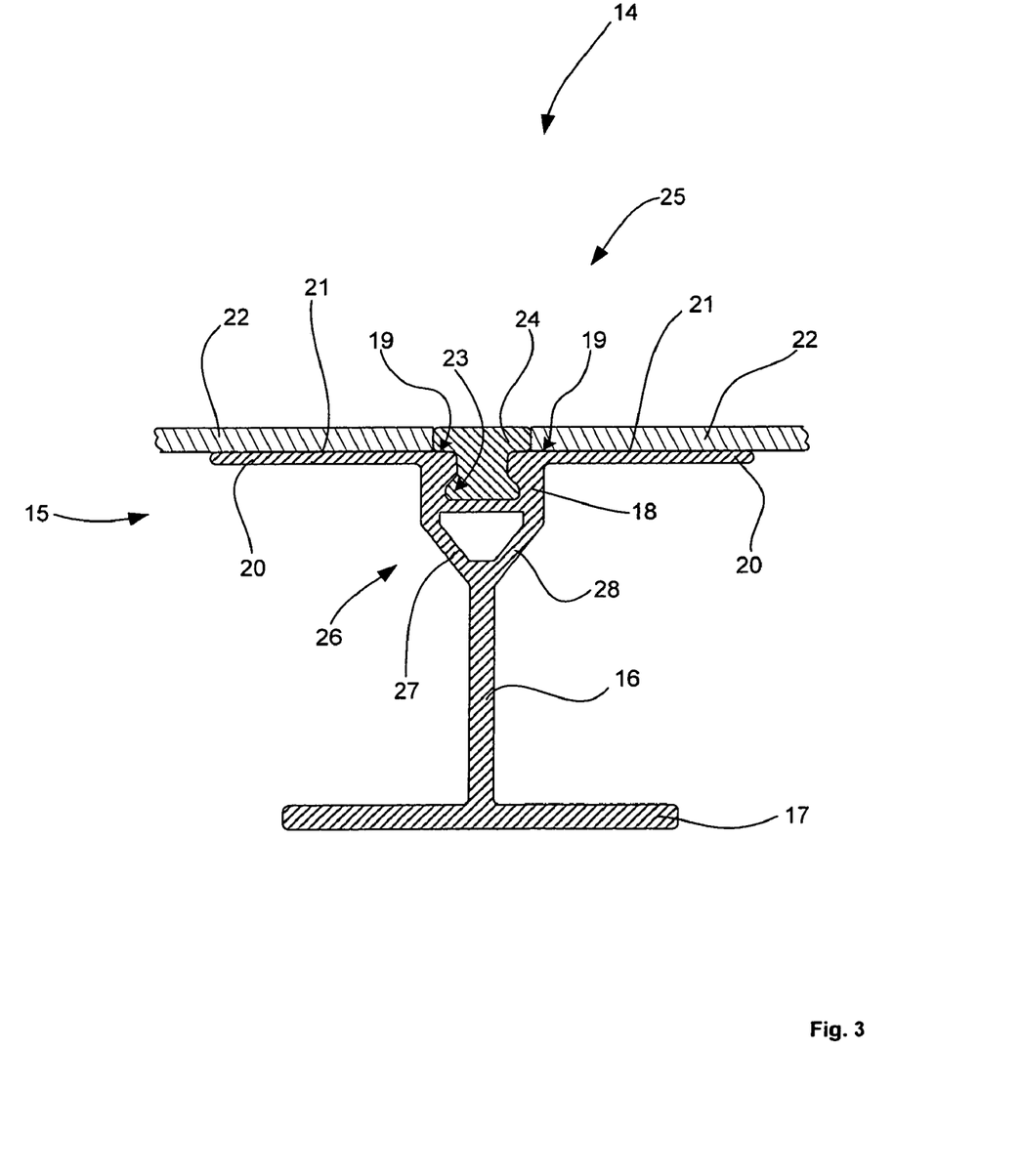
FIG. 3 is a cross-sectional view of a second embodiment of the seat rail profile with an additional reinforcement structure of the reinforcement region.

FIG. 3 shows a cross-section of a second embodiment of the seat mounting rail 14 according to the invention. The seat rail profile 14 again comprises a profile crown 15, a web 16 as well as a profile base 17. The profile crown 15 comprises a reinforcement zone 18 with a top 19 and two support flanges 20 protruding laterally in opposite directions therefrom. The support surfaces of the support flanges 20 form an essentially uninterrupted flat bearing surface 21 for supporting the floor panels 22 thereon. Finally, the reinforcement zone 18 comprises a groove 23 into which a cover element 24 having a positive fit has been inserted. Among other things this ensures the formation of an uninterrupted top surface 25 of the floor formed in this way of the floor panels 22 and the top of the cover element 24. Regarding the design of the floor panels 22 and the cover element 24, the explanation provided above with reference to FIG. 2 applies here as well.

Differing from the first embodiment of the seat rail 1 shown in FIG. 2, the seat rail 14 comprises an additional reinforcement region, i.e. a second lower reinforcement structure 26 in addition to the first upper reinforcement zone or structure 18. The lower reinforcement structure 26 is essentially formed by two webs 27, 28 that are arranged in a tapering V-shape and connect the upper reinforcement structure 18 to the web 16. The angle between the webs 27, 28 depends on the width of the upper reinforcement structure 18. This angle can be larger or smaller than the angle shown in FIG. 3. In contrast to a right-angle connection (e.g. FIGS. 1, 2), the connection shown in FIG. 3 between the upper reinforcement structure 18 and the web 16 via the tapering webs 27, 28 makes it possible to transfer greater mechanical forces. The seat rail profile 14 according to the second embodiment is thus especially advantageous in those areas of the aircraft cabin in which heavier outfitting components such as storage containers, sanitary modules and galley modules are to be arranged. A longitudinally extending hollow space or chamber is enclosed between the webs 27 and 28 and the bottom of the upper reinforcement structure 18, to ensure a lightweight structure while still achieving an increased strength.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A mounting arrangement including a mounting rail for mounting cabin outfitting components in a passenger cabin of a passenger transport vehicle, wherein said mounting rail comprises:
   a profile base;
   a profile crown; and
   a web interconnecting said profile base and said profile crown;
   wherein:
   said profile crown comprises two support flanges protruding laterally opposite one another from a reinforcement zone,
   said reinforcement zone connects said support flanges to said web and transitions from said support flanges to said web,
   said reinforcement zone has therein a groove that extends longitudinally therealong in a longitudinal direction of said mounting rail, and that extends downwardly below said support flanges in said reinforcement zone, and that is adapted to receive a securing element to secure a cabin outfitting component,
   said support flanges have flange top surfaces adapted to support panel elements thereon,
   a reinforcement zone top surface of said reinforcement zone is at least substantially flush and planar with said flange top surfaces so that said reinforcement zone top surface and said flange top surfaces together form a single bearing surface for receiving and supporting the panel elements thereon, and
   said profile base is a single horizontal base flange that is connected to a bottom of said web and that protrudes laterally in two opposite directions from said web.

2. The mounting arrangement according to claim 1, wherein the passenger transport vehicle is a passenger aircraft, the cabin outfitting components comprise passenger seats, the panel elements are floor panels, and the mounting rail is a seat mounting rail.

3. The mounting arrangement according to claim 1, wherein said support flanges protrude laterally from said reinforcement zone top surface, and said reinforcement zone extends and protrudes downwardly below said support flanges.

4. The mounting arrangement according to claim 1, wherein the only interconnection between said profile crown and said profile base is said web which is a single vertical web, and said mounting rail has an overall generally I-shaped sectional profile configuration formed of said support flanges, said web and said horizontal base flange.

5. A mounting arrangement including a mounting rail for mounting cabin outfitting components in a passenger cabin of a passenger transport vehicle, wherein said mounting rail comprises:
   a profile base;
   a profile crown; and
   a web interconnecting said profile base and said profile crown;
   wherein:
   said profile crown comprises two support flanges protruding laterally opposite one another from a reinforcement zone,
   said reinforcement zone connects said support flanges to said web and transitions from said support flanges to said web, said reinforcement zone has therein a groove that extends longitudinally therealong in a longitudinal direction of said mounting rail, and that extends downwardly below said support flanges in said reinforcement zone, and that is adapted to receive a securing element to secure a cabin outfitting component, said support flanges have flange top surfaces adapted to support panel elements thereon, a reinforcement zone top surface of said reinforcement zone is at least substantially flush and planar with said flange top surfaces so that said reinforcement zone top surface and said flange top surfaces together form a single bearing surface for receiving and supporting the panel elements thereon, and the only interconnection between said profile crown and said profile base is said web which is a single vertical web, and said mounting rail has an overall generally I-shaped sectional profile configuration formed of said support flanges, said web and said profile base.

6. The mounting arrangement according to claim 1, wherein said groove has a sectional geometry that widens downwardly toward said web.

7. The mounting arrangement according to claim 1, further comprising a cover element removably secured in said groove.

8. The mounting arrangement according to claim 7, wherein said cover element is an elongated extruded sectional element.

9. The mounting arrangement according to claim 7, further including said panel elements supported on said support flanges, wherein said panel elements and said cover element together form a substantially flush and planar upper surface.

10. The mounting arrangement according to claim 9, further comprising a sealant disposed between said panel elements and said support flanges, and between said cover element and said reinforcement zone in said groove.

11. The mounting arrangement according to claim 1, further including a large-area panel element among said panel elements that spans laterally continuously over said mounting rail and is supported on said flange top surfaces of both of said support flanges.

12. The mounting arrangement according to claim 11, further including at least three of said mounting rails spaced apart from one another, wherein said large-area panel element is supported on said flange top surfaces of both of said support flanges of at least one of said three mounting rails and is supported on said respective flange top surface of at least one of said support flanges of each one of two other ones of said three mounting rails.

13. The mounting arrangement according to claim 11, further including a cabin outfitting component that is selected from the group consisting of passenger seats, toilet or restroom modules, galley modules, partition walls, cabin trim components and storage containers, and that is mounted and secured to said large-area panel element at a location displaced away from said mounting rail.

14. A mounting arrangement including a mounting rail for mounting cabin outfitting components in a passenger cabin of a passenger transport vehicle, wherein said mounting rail comprises:
a profile base;
a profile crown; and
a web interconnecting said profile base and said profile crown;
wherein:
said profile crown comprises two support flanges protruding laterally opposite one another from a reinforcement zone,
said reinforcement zone connects said support flanges to said web and transitions from said support flanges to said web,
said reinforcement zone has therein a groove that extends longitudinally therealong in a longitudinal direction below said mounting rail, and that extends downwardly below said support flanges in said reinforcement zone, and that is adapted to receive a securing element to secure a cabin outfitting component,
said support flanges have flange top surfaces adapted to support panel elements thereon,
a reinforcement zone top surface of said reinforcement zone is at least substantially flush and planar with said flange top surfaces so that said reinforcement zone top surface and said flange top surfaces together form a single bearing surface for receiving and supporting the panel elements thereon, and
said reinforcement zone includes an upper reinforcement structure having said groove defined therein, and a lower reinforcement structure that taperingly transitions from said upper reinforcement structure to said web.

15. The mounting arrangement according to claim 14, wherein said lower reinforcement structure includes two reinforcement webs extending from a bottom of said upper reinforcement structure to a top of said web and forming a triangular sectional configuration enclosing a hollow triangular sectional chamber between said two reinforcement webs and said bottom of said upper reinforcement structure.

16. The mounting arrangement according to claim 1, wherein said mounting rail is an elongated extruded sectional profile member of a metal comprising at least one of aluminum or titanium.

17. The mounting arrangement according to claim 1, wherein said mounting rail consists of a carbon fiber reinforced plastic.

18. A mounting arrangement including a mounting rail for mounting cabin outfitting components in a passenger cabin of a passenger transport vehicle, wherein said mounting rail comprises:
a profile base;
a profile crown; and
a web interconnecting said profile base and said profile crown;
wherein:
said profile crown comprises two support flanges protruding laterally opposite one another from a reinforcement zone,
said reinforcement zone connects said support flanges to said web and transitions from said support flanges to said web,
said reinforcement zone has therein a groove that extends longitudinally therealong in a longitudinal direction below said mounting rail, and that extends downwardly below said support flanges in said reinforcement zone, and that is adapted to receive a securing element to secure a cabin outfitting component,
said support flanges have flange top surfaces adapted to support panel elements thereon,
said flange top surfaces of said support flanges lie flushly on a common plane and no part of said reinforcement zone protrudes upwardly above said common plane, said profile base is a single horizontal base flange that is connected to a bottom of said web and that protrudes laterally in two opposite directions from said web, and the only interconnection between said profile crown and said profile base is said web which is a single vertical web, and said mounting rail has an overall generally I-shaped sectional profile configuration formed of said support flanges, said web and said horizontal base flange.

19. A mounting arrangement including a mounting rail for mounting cabin outfitting components in a passenger cabin of a passenger transport vehicle, wherein said mounting rail comprises:
- a profile base;
- a profile crown; and
- a web interconnecting said profile base and said profile crown;

wherein:
said profile crown comprise-s two support flanges protruding laterally opposite one another from a reinforcement zone, said reinforcement zone connects said support flanges to said web and transitions from said support flanges to said web, said reinforcement zone has therein a groove that extends longitudinally therealong in a longitudinal direction of said mounting rail and that is adapted to receive a securing element to secure a cabin outfitting component, said support flanges have flange top surfaces adapted to support panel elements thereon, said flange top surfaces of said support flanges lie flushly on a common plane and no part of said reinforcement zone protrudes upwardly above said common plane, said reinforcement zone includes an upper reinforcement structure having said groove defined therein, and a lower reinforcement structure that taperingly transitions from said upper reinforcement structure to said web, and said lower reinforcement structure includes two reinforcement webs extending from a bottom of said upper reinforcement structure to a top of said web and forming a triangular sectional configuration enclosing a hollow triangular sectional chamber between said two reinforcement webs and said bottom of said upper reinforcement structure.

\* \* \* \* \*

UNITED STATES PATENT AND TRADEMARK OFFICE
CERTIFICATE OF CORRECTION

PATENT NO. : 7,281,685 B2  Page 1 of 1
APPLICATION NO. : 11/209497
DATED : October 16, 2007
INVENTOR(S) : Schoene

It is certified that error appears in the above-identified patent and that said Letters Patent is hereby corrected as shown below:

Column 10,
Line 10, before "said mounting rail", replace "below" by --of--;
Line 59, before "said mounting rail", replace "below" by --of--;

Column 11,
Line 19, after "crown", replace "comprise-s" by --comprises--.

Signed and Sealed this

Seventeenth Day of March, 2009

JOHN DOLL
*Acting Director of the United States Patent and Trademark Office*